US012320364B2

(12) United States Patent
Connolly

(10) Patent No.: US 12,320,364 B2
(45) Date of Patent: Jun. 3, 2025

(54) PUMP FOR CONVEYING WASTEWATER AND IMPELLER FOR SUCH A PUMP

(71) Applicant: Sulzer Management AG, Winterthur (CH)

(72) Inventor: Robert Connolly, Wexford (IE)

(73) Assignee: Sulzer Management AG, Winterthur (CH)

( * ) Notice: Subject to any disclaimer, the term of this patent is extended or adjusted under 35 U.S.C. 154(b) by 0 days.

(21) Appl. No.: 18/524,311

(22) Filed: Nov. 30, 2023

(65) Prior Publication Data

US 2024/0191723 A1 Jun. 13, 2024

(30) Foreign Application Priority Data

Dec. 13, 2022 (EP) .................................... 22213132

(51) Int. Cl.
*F04D 29/42* (2006.01)
*F04D 7/04* (2006.01)
(Continued)

(52) U.S. Cl.
CPC ........... *F04D 29/4293* (2013.01); *F04D 7/04* (2013.01); *F04D 29/225* (2013.01);
(Continued)

(58) Field of Classification Search
CPC .... F04D 29/225; F04D 29/242; F04D 29/245; F04D 7/04; F04D 29/2294;
(Continued)

(56) References Cited

U.S. PATENT DOCUMENTS 3,130,678 A * 4/1964 Chenault ............... F04D 29/426 415/206
3,874,812 A * 4/1975 Hanagarth ................ F04D 1/06 415/106
(Continued)

FOREIGN PATENT DOCUMENTS

JP 2005002857 A 1/2005
JP 2005002858 A 1/2005
WO 2011042515 A1 4/2011

OTHER PUBLICATIONS

English machine translation of JP 2005-2857A, Mar. 20, 2024.*
(Continued)

*Primary Examiner* — Christopher Verdier
(74) *Attorney, Agent, or Firm* — Global IP Counselors, LLP

(57) ABSTRACT

An impeller for a pump for conveying wastewater is proposed, includes a shroud to be rotated about an axis of rotation defining an axial direction, and a blade to convey the wastewater. The blade includes a leading edge, a trailing edge, a pressure side, a suction side and an upper rim. The blade extends from the shroud in the axial direction to the upper rim and extends in a circumferential direction from the leading edge to the trailing edge. The suction side is the radially inner surface of the blade and the pressure side is the radially outer surface of the blade. The blade includes a closed passage extending inside the blade. The passage has an inlet at the pressure side and an outlet at the suction side of the blade.

13 Claims, 4 Drawing Sheets

(51) Int. Cl.
*F04D 29/22* (2006.01)
*F04D 29/24* (2006.01)

(52) U.S. Cl.
CPC ....... *F04D 29/2255* (2013.01); *F04D 29/245* (2013.01); *F04D 29/2294* (2013.01); *F04D 29/242* (2013.01); *F05D 2240/30* (2013.01)

(58) Field of Classification Search
CPC .. F04D 29/2216; F04D 29/2255; F04D 13/08; F04D 29/2266
USPC .................................. 415/104, 106; 416/181
See application file for complete search history.

(56) References Cited

U.S. PATENT DOCUMENTS

| | | | | |
|---|---|---|---|---|
| 6,123,507 | A * | 9/2000 | Weis | F04D 29/225 416/144 |
| 2006/0263200 | A1* | 11/2006 | Ahlroth | F04D 29/2266 415/58.2 |
| 2015/0240818 | A1* | 8/2015 | Haddad | F04D 29/4273 415/206 |

OTHER PUBLICATIONS

English machine translation of JP 2005-2858A, Mar. 20, 2024.*
European Search Report issued Jun. 2, 2023 in corresponding European Application No. 22213132.8.

* cited by examiner

PUMP FOR CONVEYING WASTEWATER AND IMPELLER FOR SUCH A PUMP

CROSS-REFERENCE TO RELATED APPLICATION

This application claims priority to European Application No. 22213132.8, filed Dec. 13, 2022, the contents of which are hereby incorporated by reference.

BACKGROUND

Technical Field

The disclosure relates to a pump for conveying wastewater or liquids containing solids and to an impeller for such a pump.

Background Information

Regarding the conveyance of waste water such as domestic wastewater or industrial wastewater problems result because such liquids contain fibrous materials, cloths, textiles, rags or other solids which can very easily become stuck in or at the pump and can then result in a reduction in the efficiency, in particular the hydraulic efficiency, of the pump up to the complete blocking of the impeller of the pump. This can cause servicing or also complex and/or expensive maintenance work resulting in a significant down time. One of the clogging issues results from rags or fibers becoming wrapped around the leading edge of the blade. Special measures therefore have to be taken with such pumps in order to prevent clogging.

SUMMARY

Such pumps are frequently configured as centrifugal pumps having radial, semi-axial, or axial impellers, with the impeller having only one blade or also a plurality of blades, for example two blades. Impellers that are specifically configured for the conveyance of wastewater are for example disclosed in WO 2014/029790 or in WO 2011/042515. These impellers, which are specifically designed for the conveyance of wastewater perform very well regarding blockage resistance in particular when operated at the best efficiency point (BEP) or in overload conditions. i.e. when the flow rate referred to the flow rate at the BEP is larger than one (q*>1). Under such favorable conditions the impeller functions by creating a high velocity in a region of the suction surface so as to remove blockage such as trapped fibers. However, at partial load of the pump, when q*, the flow rate referred to the flow rate at BEP, becomes smaller, for example in the operational range with q*≤0.7, the impeller is exposed to reduced inertial forces from the flow. As a result, increased levels of blockage are typically seen in wastewater impellers at q*≤0.7.

Starting from this state of the art, it is therefore an object of the disclosure to propose an impeller for a pump for conveying wastewater having an improved resistance against blockages in particular during part load operation, when the flow rate referred to the flow rate at BEP is lower than one. Furthermore, it is an object of the disclosure to propose a pump for conveying wastewater or liquids containing solids.

The subject matter of the disclosure satisfying these objects is characterized by the features described herein.

Thus, according to the disclosure, an impeller for a pump for conveying wastewater is proposed, comprising a shroud configured to be rotated about an axis of rotation defining an axial direction, and at least one blade for conveying the wastewater, wherein the blade comprises a leading edge, a trailing edge, a pressure side, a suction side and an upper rim, wherein the blade extends from the shroud in the axial direction to the upper rim, wherein the blade extends in a circumferential direction from the leading edge to the trailing edge, wherein the suction side is the radially inner surface of the blade and the pressure side is the radially outer surface of the blade. The blade comprises a closed passage extending inside the blade, the passage having an inlet at the pressure side and an outlet at the suction side of the blade.

The term "closed passage" shall be understood as a passage which is completely closed on all sides or along the entire circumference, respectively, so that the inlet and the outlet are the sole openings through which a fluid can enter or leave the passage.

By providing the closed passage extending from the pressure side to the suction side of the blade, a disturbance is created near the leading edge, which supports the removal of blockage. In particular, when the flow rate referred to the flow rate at the BEP is smaller than one (q*<1), for example in the operational range with q*≤0.7, the flow through the impeller becomes smaller, which reduces the removal of blockage build-up in particular at the suction side of the blade. By providing the closed passage extending from the pressure side to the suction side of the blade a flow across the leading edge is created. The flow through the closed passage supports the removal of blocking material and thus prevents the build-up of blockage in particular at the suction side of the blade.

By the closed passage from the pressure side to the suction side a jet is created using the pumped medium to disturb any material build-up on the suction side, especially in the region at the leading edge. This jet is driven by the pressure differential between a high pressure region at the pressure side of the blade and the low pressure region inboard of the stagnation line at the suction side of the blade. The jet created by the closed passage is ideal for low flow conditions where pressure forces become dominant within the pump. The pressure differential across the closed passage, i.e. the pressure difference between the pressure prevailing at the inlet of the closed passage and the pressure prevailing at the outlet of the closed passage drives the fluid flow through the closed passage, whereas the centrifugal forces will prevent fibers from entering the closed passage.

The geometry of the closed passage as well as the location of the inlet and the outlet regarding the axial direction can be optimized to ensure an optimal blockage resistance concurrent with a minimized impact on the hydraulic efficiency of the pump.

Preferably, the passage is arranged adjacent to the leading edge of the blade to ensure an optimal removal of any blockage build up at the suction side of the blade. Usually, the blade(s) of an impeller of a pump for conveying wastewater is/are configured with a rounded leading edge and not with a sharp edge. For this configuration the stagnation line at the leading edge is considered as the boundary between the pressure side and the suction side of the blade.

According to a preferred configuration the inlet of the passage has a cross-sectional area which is different from a cross-sectional area of the outlet of the passage.

In order to support the generation of a strong jet, it is preferred that the cross-sectional area of the inlet is larger than the cross-sectional area of the outlet. By this measure the flow velocity of the fluid is increased with in the closed passage.

Furthermore, it can be advantageous, that the inlet is arranged perpendicular to the pressure side. This means, that the cross-sectional area through which the fluid enters the closed passage has a normal vector which is perpendicular to the pressure side of the blade.

In addition, it can be advantageous, that the outlet is arranged perpendicular to the suction side. This means, that the cross-sectional area through which the fluid leaves the closed passage has a normal vector which is perpendicular to the suction side of the blade.

Additional preferred measures regarding the configuration of the impeller comprise the following features:

The inlet and the outlet have a distance from the shroud regarding the axial direction, which is larger than the distance from the upper rim of the blade.

The inlet has a first distance from the shroud regarding the axial direction, and the outlet has a second distance from the shroud regarding the axial direction, wherein the first distance is different from the second distance.

Preferably, the first distance is smaller than the second distance.

The passage is configured to be curved regarding the axial direction.

The passage is configured to be curved in a radial direction perpendicular to the axial direction.

Regarding the manufacturing of the impeller it is one preferred option, that the impeller is configured as a cast impeller. For casting the impeller a core can be provided in the casting mold as a place holder for the closed passage.

It is also possible to manufacture the impeller by an additive manufacturing process, e.g. by 3D-printing, or by a hybrid manufacturing process comprising both subtractive manufacturing (e.g. machining or milling) and additive manufacturing.

Furthermore, according to the disclosure, a pump for conveying wastewater or liquids containing solids is proposed, wherein the pump has an impeller which is configured according to the disclosure.

In particular, the pump can be configured as a submersible pump.

Further advantageous measures and embodiments of the disclosure will become apparent from the present disclosure.

BRIEF DESCRIPTION OF THE DRAWINGS

Embodiments of the invention will be explained in more detail hereinafter with reference to the drawings. There are shown in a schematic representation.

DETAILED DESCRIPTION

Figure 1:
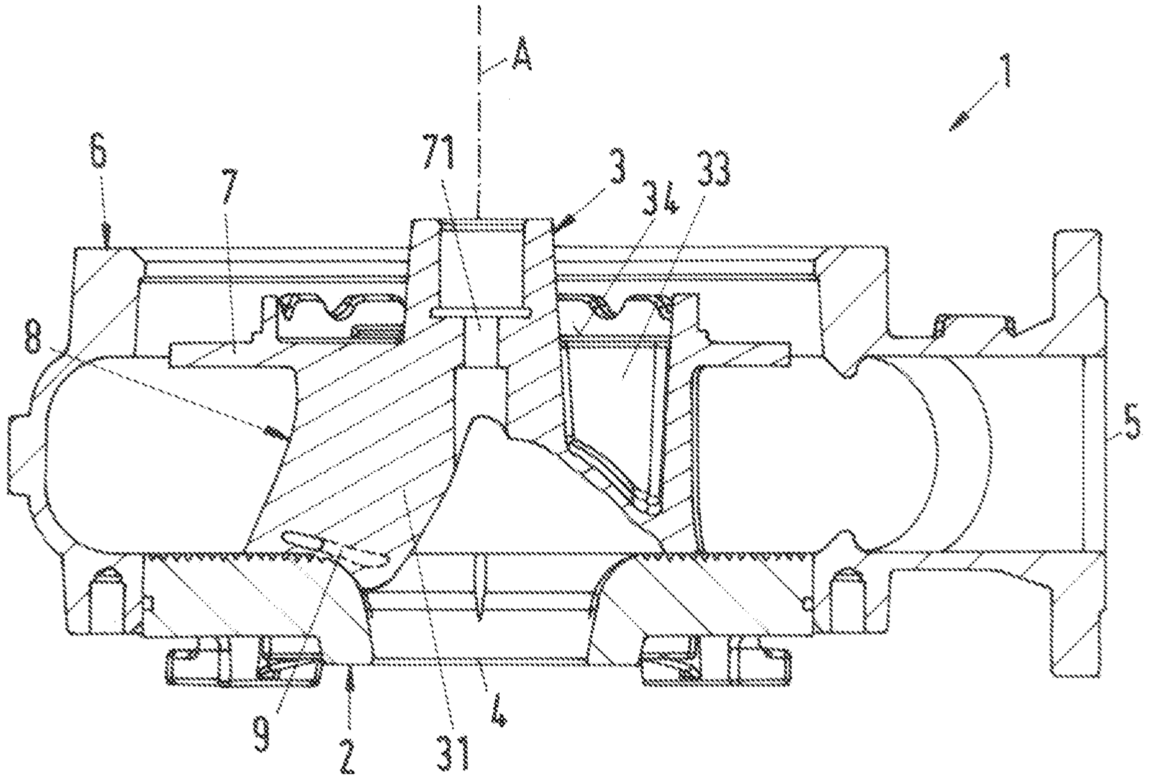
FIG. 1 is a sectional view of an embodiment of a pump in accordance with the disclosure.

FIG. 1 shows in a sectional representation an embodiment of a pump in accordance with the disclosure which is designated in its entity with reference numeral 1. The pump 1 is configured for conveying wastewater or liquids containing solids. In particular, the pump 1 is configured as a submersible pump. The pump 1 includes in a manner known per se a base plate 2, which is fastened to a housing 6 for example by a plurality of screws (not shown). The pump 1 further comprises an impeller 3 rotatable about an axis of rotation defining an axial direction A. The impeller 3 is configured as a centrifugal impeller 3 for conveying the fluid from a suction opening 4 to a discharge opening 5 of the pump 1. The suction opening 4 is centrally disposed in the base plate 2. In the operating state, the impeller 3 rotates, driven for example by an electric motor which is not shown, about the axial direction A, thereby sucking the fluid to be conveyed, that is here the wastewater, through the suction opening 4 and conveys it to the discharge opening 5.

In the embodiment shown in FIG. 1 the impeller 3 is configured as a single blade impeller 3, i.e. the impeller 3 has exactly one blade 8 for conveying the wastewater from the suction opening 4 to the discharge opening 5. A single blade impeller for conveying wastewater is for example disclosed in WO 2011/042515.

In other embodiments, the impeller 3 is designed with a plurality of blades, for example with exactly two blades for conveying the wastewater or with more than two blades and in particular with three blades. An impeller with a plurality of blades for conveying wastewater is for example disclosed in WO 2014/029790.

The single blade impeller 3 of the pump 1 shown in FIG. 1 will now be explained in more detail referring to FIG. 2 to FIG. 4.

Figure 2:
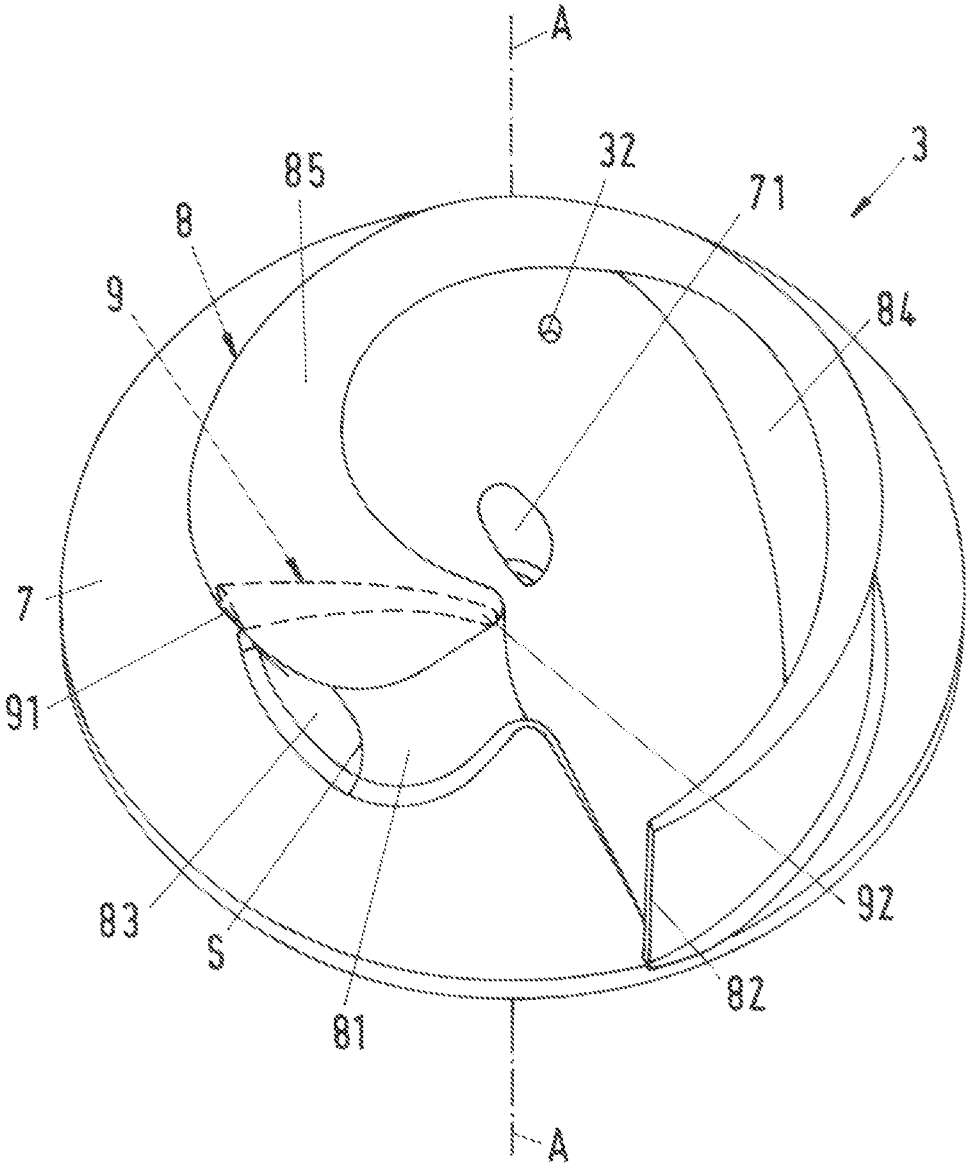
FIG. 2 is a perspective view of an embodiment of an impeller in accordance with the disclosure.

FIG. 2 shows a perspective view of an embodiment of an impeller in accordance with the disclosure, wherein the view is from the direction, where the base plate 2 is located in the assembled state of the pump 1.

Figure 3:
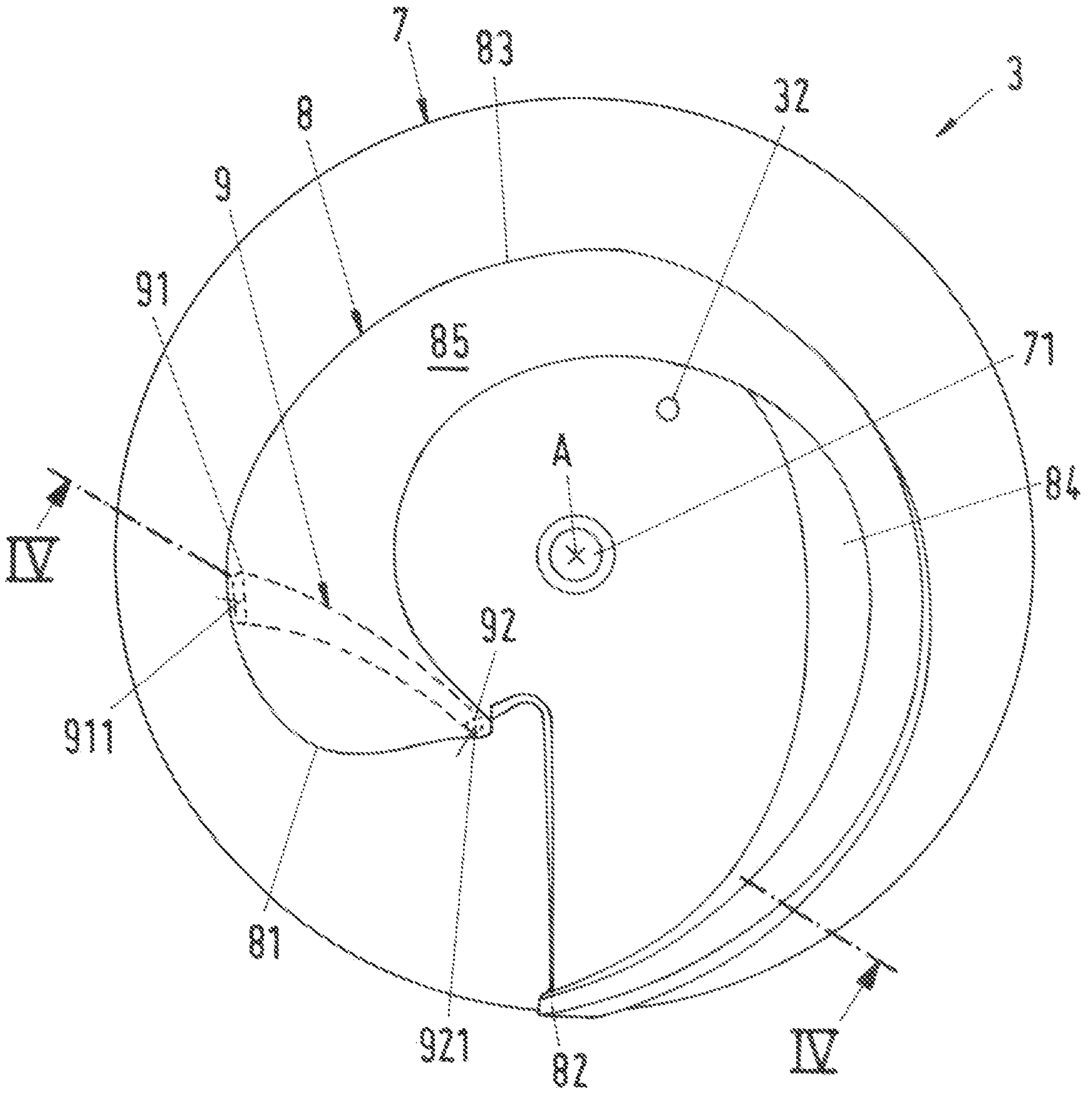
FIG. 3 is a plan view of the impeller shown in FIG. 2.

FIG. 3 is a plan view of the impeller 3 as seen when looking in the axial direction from the suction opening 4 (FIG. 1) towards the impeller 3.

Figure 4:
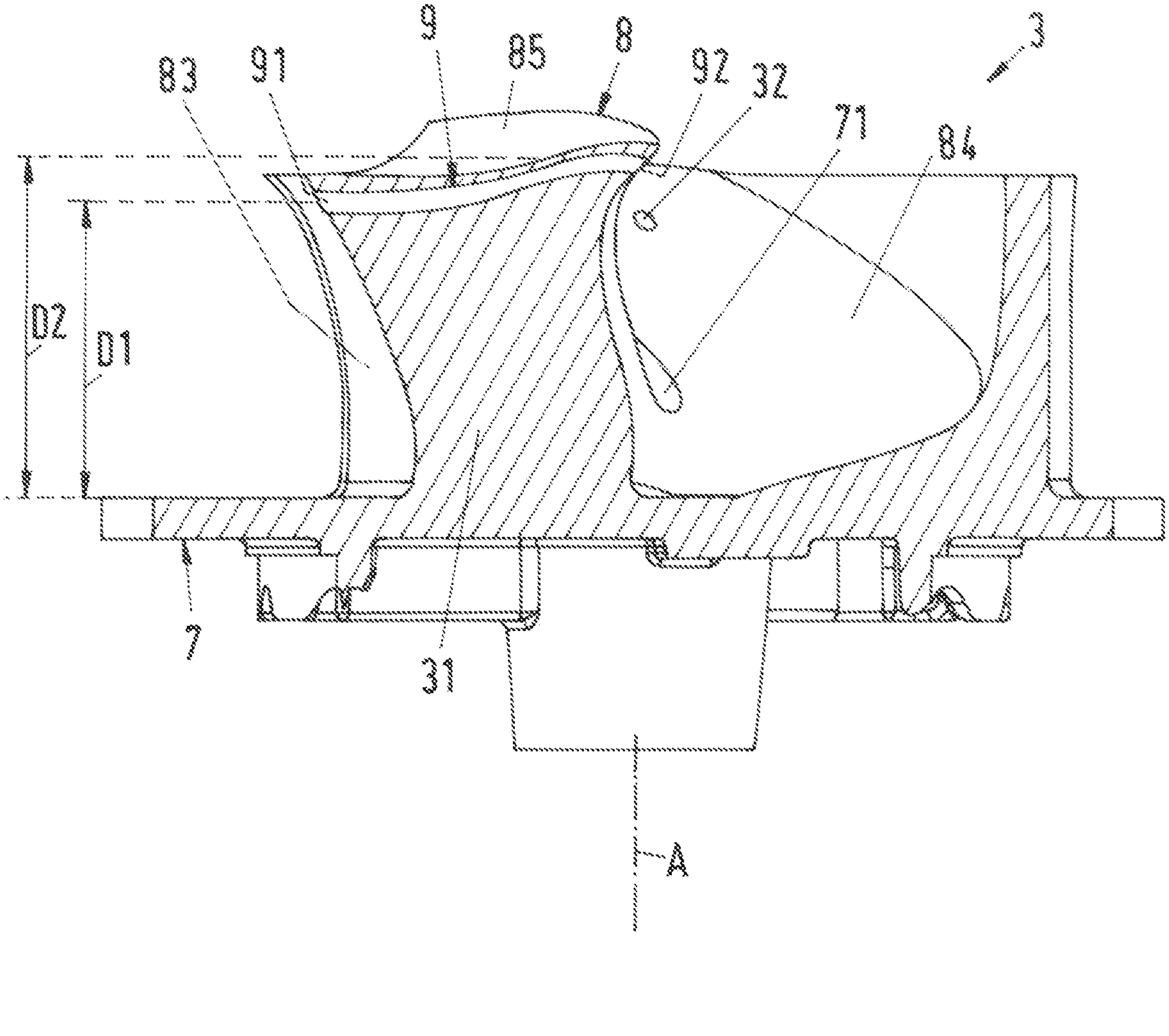
FIG. 4 is a cross-sectional view of the impeller in FIG. 3 along the cutting line IV-IV in FIG. 3.

FIG. 4 is a cross-sectional view of the impeller 3 in a view along the cutting line IV-IV in FIG. 3.

The impeller 3 comprises a shroud 7 configured to be rotated about the axis of rotation, i.e. about the axial direction A. The shroud 7 comprises a central opening 71 for receiving a drive shaft (not shown), which is connected to the electric motor for driving the rotation of the impeller 3. The impeller 3 further comprises the blade 8, which is fixedly connected to the shroud 7. The blade 8 comprises a leading edge 81, a trailing edge 82, a pressure side 83, a suction side 84 and an upper rim 85. Regarding the axial direction A the blade 8 extends from the shroud 7 in the axial direction A to the upper rim 85. Regarding the circumferential direction the blade 8 extends from the leading edge 81 spirally outwardly with a changing curvature to the trailing edge 82. Thus, regarding the radial direction perpendicular to the axial direction A, the leading edge 81 is located radially inwardly from the trailing edge 82, meaning that the leading edge 81 is located closer to the axis of rotation than the trailing edge 82. The trailing edge 82 is located at the radially outer rim of the shroud 7. Preferably, the trailing edge 82 slightly overhangs the shroud 7 regarding the radial direction.

The suction side 84 is the radially inner surface of the blade 8 and the pressure side 83 is the radially outer surface of the blade 8. The suction side 84 and the pressure side 83 abut each other at the leading edge 81. As it is known in the art of wastewater pumps the leading edge 81 is preferably configured as a rounded region rather than a sharp edge. The transition from the pressure side 83 to the suction side 84 is located at the stagnation line S, thus the pressure side 83 is located at the high pressure side of the stagnation line S and the suction side 84 is located at the low pressure side of the stagnation line S.

The upper rim 85 of the blade is the boundary surface of the blade 8 remote from the shroud 7 and extending in the direction of the longitudinal extent of the blade 8. The upper rim 85 is thus that boundary surface of the blade 8 which faces the base plate 2 in the assembled state of the pump 1. The upper rim 85 is configured with a changing width as measured perpendicular to the axial direction A. When moving from the leading edge 81 along the upper rim 85 towards the trailing edge 82, the width of the upper rim 85 firstly increases, reaches a maximum and then decreases to a value at the trailing edge 82, which is considerably smaller than the width at the leading edge 81.

Preferably, the blade 8 is formed integrally as one piece with the shroud 7. For example, the entire impeller 3 is cast of metal, for example cast iron, although any other suitable material can be used.

During operation of the pump 1 the fluid is drawn through the suction opening 4 (FIG. 1) into the impeller 3 and then discharged from the impeller 3 through the channel defined between the leading edge 81 and the trailing edge 82. The channel is delimited by the suction side 84 of the blade 8. The suction side 84 has a sloping profile such as to define a path through the impeller 3 which extends helically downward from the upper rim 85 to the shroud 7. Referring in particular to FIG. 1 and FIG. 4 it can be seen that providing this helical path through the impeller 3 requires a significant infill 31 directly above the shroud 7 (regarding the representation in FIG. 4). The infill 31 eliminates dead space within the impeller 3 which could give rise to clogging. The helical path is achieved by sloping the suction side 84 of the blade 8 radially inwardly from the upper rim 85, in particular in the region adjacent to the leading edge 81, with the slope of the suction side 84 reducing towards the trailing edge 82, such that the suction side 84 is substantially perpendicular to the shroud 7 in the region of the trailing edge 82. Thus, regarding the axial direction A the thickness of the blade 8 increases when moving from the upper rim 85 towards the shroud 7. The increase in the thickness is more pronounced in the region of the leading edge 81.

The impeller 3 further comprises a relief hole 32 (FIG. 2) extending from the suction side 84 of the blade 8 in axial direction A to a balancing cavity 33 (FIG. 1), which is open to the backside 34 of the impeller 3. The backside 34 of the impeller 3 is the side of the shroud 7 facing away from the blade 8 of the impeller 3. The balancing cavity 33 is provided in order to reduce the mass of the impeller 3 on the heavier side of the impeller 3. This is advantageous in view of the dynamic balance of the impeller 3 during operation. The balancing cavity 33 at least partially compensates the additional mass caused by the infill 31, which is provided for achieving the sloping helical path delimited by the suction side 84 of the blade 8.

In addition, the relief hole 32 contributes to reduce the pressure difference between the high pressure side of the impeller 3 and the low pressure side. During operation of the pump 1 the backside 34 of the impeller 3 is exposed to a higher pressure than the suction side, which faces the suction opening 4 of the pump 1. The relief hole 32 contributes to balancing the impeller 3 relative to the axial direction A. By reducing the pressure difference between the high pressure side and the low pressure side of the impeller 3, the load that has to be carried by the bearings of the drive shaft, in particular the axial load, is reduced.

According to the disclosure, the blade 8 comprises a closed passage 9 extending inside the blade 8, the passage 9 having an inlet 91 at the pressure side 83 and an outlet 92 at the suction side 84 of the blade 8.

Within the framework of this application the wording “closed passage” designates a passage, e.g. a channel, which is completely closed, except for the inlet 91 and the outlet 92. The closed passage 9 has a tubular shape, that is to say, the closed passage 9 is limited by one wall or by several walls anywhere vertical to its main direction of flow. In contrast, an open passage designates a passage, which is not limited by a wall in a direction vertical to its main direction of flow, thus in a direction vertical to its longitudinal extension, but it is open. So, for example, a passage with an U-shaped or a V-shaped wall is an open passage. If the open side of the U-profile or of the V-profile were covered with a plate, the passage would be a closed passage.

The closed passage 9 is located completely inside of the blade 8 and provides a flow communication between the pressure side 83 and the suction side 84 of the blade 8. Thus, the fluid to be conveyed by the pump 1 can flow from the pressure side 83 through the passage 9 to the suction side 84 of the blade 8. The inlet 91 and the outlet 92 of the closed passage 9 are located on different sides of the stagnation line S. The inlet 91 is located at the high pressure side of the stagnation line S and the outlet 92 is located at the low pressure side of the stagnation line S. During operation of the pump 1 the pressure prevailing at the pressure side 83 of the blade 8 is higher than the pressure prevailing at the suction side 84. Therefore, the inlet 91 of the closed passage 9 is exposed to a higher pressure than the outlet 92 of the closed passage 9. The pressure drop over the closed passage 9 causes a flow of the fluid, e.g. water, through the closed passage 9.

Therefore, by the closed passage 9 a jet is generated exiting the closed passage 9 through the outlet 92 at the suction side 84 of the blade 8. The jet disturbs the build-up of any material at the suction side 84, that could cause a blockage. The jet is driven by the pressure drop across the closed passage 9, i.e. by the pressure difference between the pressure prevailing at the inlet 91 and the pressure prevailing at the outlet 92. By the closed passage 9 a positive flow can be generated in particular in such regions at the suction side 84, where there is a risk of stagnating material such as fibers or rags.

It has been found that the solids in the wastewater are prevented from entering the closed passage 9, e.g. by centrifugal forces, so that there is a very low risk of a clogging of the closed passage 9.

In view of a high efficiency of the closed passage regarding the removal of material from the suction side 84 of the blade 8 it is preferred to locate the closed passage 9 adjacent to the leading edge 81 as it is best seen in FIG. 2 or FIG. 3.

The specific geometry of the closed passage 9 as well as the location for the inlet 91 and the outlet 92 can be optimized depending on the respective application. Computer based analysis, numerical methods or simulations, e.g. CFD (Computational Fluid Dynamics) methods can be used to optimize the geometry as well as the location of the closed passage 9.

As it can be seen for example in FIG. 3 it is preferred, that the inlet 91 has a cross-sectional area 911 which is different from a cross-sectional area 921 of the outlet 92. In particular, the cross-sectional area 911 of the inlet 91 is larger than the cross-sectional area 921 of the outlet 92. Thus, the closed passage 9 is configured as a nozzle and accelerates the fluid when flowing through the passage 9. Increasing the flow velocity of the fluid in the passage 9 increases the power of the jet discharged at the outlet 92.

Furthermore, it became apparent, that it is advantageous to arrange the inlet 91 and/or the outlet 92 perpendicular to the pressure side 83 or the suction side 84, respectively, meaning that the normal vector of the cross-sectional area 911 of the inlet 91 is perpendicular to the pressure side 83 and/or the normal vector of the cross-sectional area 921 of the outlet 92 is perpendicular to the suction side 84.

In addition, it became evident that it is advantageous to arrange the closed passage 9, regarding the axial direction A, closer to the upper rim 85 than to the shroud 7. Thus, regarding the axial direction A, the inlet 91 and the outlet 92 have a distance D1, D2 (FIG. 4) from the shroud 7 which is larger than the respective distance from the upper rim 85 of the blade 8. As shown in FIG. 4, D1, referred to as first distance, denotes the distance of the inlet 91 from the shroud 7, and D2, referred to as second distance, denotes the distance of the outlet 92 from the shroud 7. Both the first and the second distance D1 and D2 are considerably larger than half of the height of the blade 8 in the axial direction A. The height is the maximum distance between the shroud 7 and the upper rim 85 of the blade 8.

Depending on the respective application, e.g. the specific configuration of the impeller 3, it might be advantageous that the first distance D1 is different from the second distance D2.

As it can be best seen in FIG. 4 in the described embodiment of the impeller 3 the first distance D1 is smaller than the second distance D2, i.e. regarding the axial direction A, the inlet 91 is closer to the shroud 7 than the outlet 92.

Furthermore, the closed passage 9 is configured as a curved passage 9. In particular, as it can be seen for example in FIG. 4 the passage 9 is configured to be curved regarding the axial direction A.

As it can be seen e.g. in FIG. 2 the passage 9 is configured to be curved also with respect to the radial direction, which is perpendicular to the axial direction A.

In other embodiments the closed passage 9 is configured as a straight passage. The straight passage can extend parallel to the shroud 7 or slanted with respect to the shroud 7.

Regarding the manufacturing of the impeller 3 it is one preferred option, that the impeller 3 is configured as a cast impeller 3. For casting the impeller a core can be provided in the casting mold as a place holder for the closed passage 9. Of course, it is also possible to generate the closed passage 9 after the casting process, for example by machining, drilling or other methods. In particular, the closed passage can be configured as a bore, which is drilled or otherwise machined into the blade 8.

It is also possible to manufacture the impeller 3 by an additive manufacturing process. e.g. by 3D-printing, or by a hybrid manufacturing process comprising both subtractive manufacturing (e.g. machining or milling) and additive manufacturing.

What is claimed is:

1. An impeller for a pump for conveying wastewater, comprising:

a shroud configured to be rotated about an axis of rotation defining an axial direction; and a blade configured to convey the wastewater, the blade comprising a leading edge, a trailing edge, a pressure side, a suction side and an upper rim, the blade extending from the shroud in the axial direction to the upper rim, the blade extending in a circumferential direction from the leading edge to the trailing edge, the suction side being the radially inner surface of the blade and the pressure side being the radially outer surface of the blade, the blade comprising a closed passage extending inside the blade, and the passage having an inlet at the pressure side and an outlet at the suction side of the blade, the inlet of the passage having a cross-sectional area different from a cross-sectional area of the outlet of the passage.

2. The impeller in accordance with claim 1, wherein the passage is arranged adjacent to the leading edge of the blade.

3. The impeller in accordance with claim 1, wherein the cross-sectional area of the inlet is larger than the cross-sectional area of the outlet.

4. The impeller in accordance with claim 1, wherein the inlet is arranged perpendicular to the pressure side.

5. The impeller in accordance with claim 1, wherein the outlet is arranged perpendicular to the suction side.

6. The impeller in accordance with claim 1, wherein the inlet and the outlet have a distance from the shroud regarding the axial direction, which is larger than a distance from the upper rim of the blade.

7. The impeller in accordance with claim 1, wherein the inlet has a first distance from the shroud regarding the axial direction, and the outlet has a second distance from the shroud regarding the axial direction, and the first distance is different from the second distance.

8. The impeller in accordance with claim 7, wherein the first distance is smaller than the second distance.

9. The impeller in accordance with claim 1, wherein the passage is configured to be curved regarding the axial direction.

10. The impeller in accordance with claim 1, wherein the passage is configured to be curved in a radial direction perpendicular to the axial direction.

11. The impeller in accordance with claim 1, wherein the impeller is a cast impeller.

12. A pump for conveying wastewater or liquids containing solids, comprising:

the impeller according to claim 1.

13. The pump in accordance with claim 12, wherein the pump is a submersible pump.

* * * * *